Dec. 15, 1925. Re. 16,228

A. A. RIETZKE

STEERING DEVICE

Original Filed Sept. 1, 1921 2 Sheets-Sheet 1

Inventor:
A. A. Rietzke
By: Frank J. Harrow
Attorney.

Dec. 15, 1925.

Re. 16,228

A. A. RIETZKE

STEERING DEVICE

Original Filed Sept. 1, 1921 2 Sheets-Sheet 2

Inventor:
A. A. Rietzke
By: Neal O'Harron
Attorney.

Reissued Dec. 15, 1925. Re. 16,228

UNITED STATES PATENT OFFICE.

ADOLPH A. RIETZKE, OF VALLEY PARK, MISSOURI, ASSIGNOR OF ONE-HALF TO HENRY CORNELSEN, OF TEXHOMA, OKLAHOMA.

STEERING DEVICE.

Original No. 1,403,708, dated January 17, 1922, Serial No. 497,593, filed September 1, 1921. Application for reissue filed June 16, 1922. Serial No. 568,880.

*To all whom it may concern:*

Be it known that I, ADOLPH A. RIETZKE, a citizen of the United States, residing at Valley Park, in the county of St. Louis and State of Missouri, have invented a new and useful Steering Device, of which the following is a specification.

This invention relates to steering devices for tractors, the primary object of the invention being to provide a steering device which will automatically steer the tractor to which the same is applied, eliminating the necessity of the operator moving the usual steering mechanism to accomplish the steering of the machine.

Another object of the invention is to provide a steering device of this character which may be adjusted to line the steering device with a furrow.

A further object of the invention is to provide resilient means having connection with the wheel of the steering device for permitting slight movement of the wheel of the steering device, when the same encounters irregularities.

A still further object is to provide adjustable and pivotal connections between the guide wheel and the steering wheels of the tractor.

With the above and other objects in view which will appear as the description proceeds, the invention resides in the combination and arangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1:
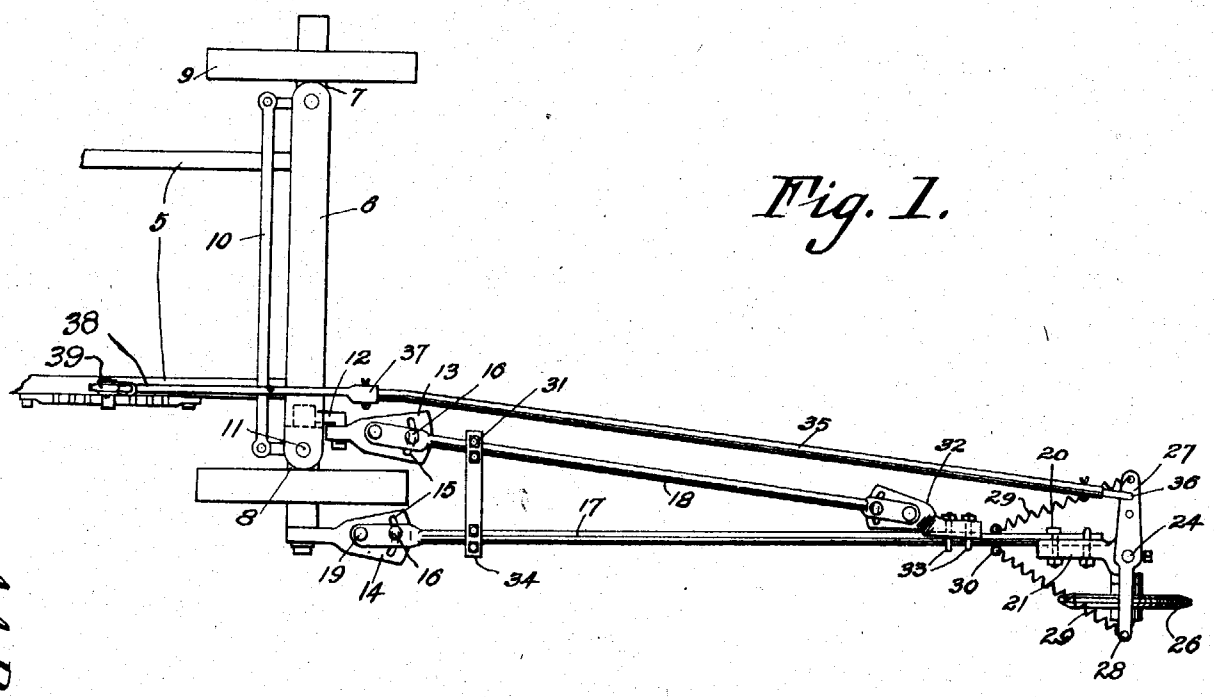
Figure 1 is a plan view of a steering device constructed in accordance with the present invention, and showing the same as applied to the front or steering wheels of a tractor.
Figure 2:
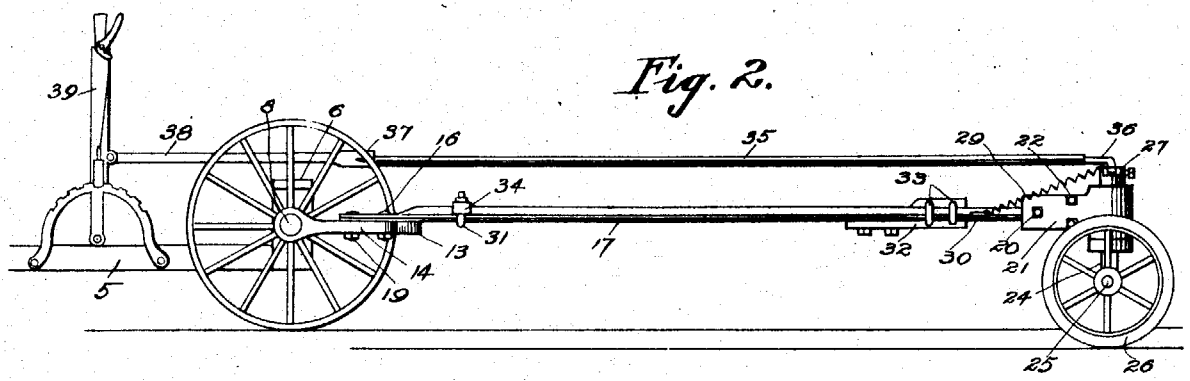
Figure 2 is a side elevational view of the same.
Figure 4:
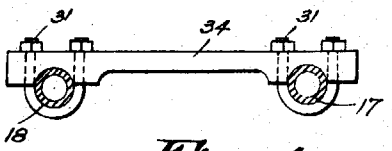
Figure 4 is a detail view illustrating the connection between the main rod of the steering device and the adjustable brace rod associated therewith.
Figure 3:
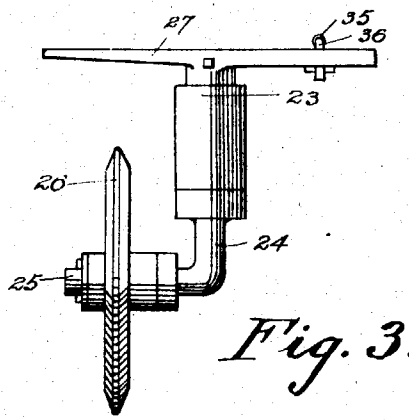
Figure 3 is an enlarged detail view of the steering wheel of the steering device.

Referring to the drawings in detail, the side rails of a tractor are indicated by the reference character 5, which side rails have connection with the axle 6 in the usual manner, to which axle 6 are pivotally secured the stub axles 7 and 8 on which operate the front or steering wheels 9 of the tractor. The structure of the stub axles 7 and 8 is such as to permit the axles to be moved in unison, due to the connecting rod 10 which has connection with the stub axles in the usual manner.

The stub axle 8 is shown as pivoted at 11, one end thereof extends inwardly beyond the pivot 11, where the same is provided with a right angled arm 12 which connects with the adjusting block 13 in a manner to permit of slight movement of the adjusting block with respect to the arm 12. At the opposite end of the axle 8 is an adjusting block 14, the blocks being shown as provided with curved slots 15 which accommodate the bolts 16 that pass through the rods 17 and 18 respectively, so that the rods 17 and 18 may be adjusted laterally to accomplish a particular steering of the tractor associated therewith.

The rod 17 which is the main or supporting rod of the steering device, has pivotal connection with the adjusting block 14 as at 19, the forward end of the rod being provided with an opening to accommodate the bolt 20, which connnects the steering head 21 to the rod 17, the U-bolt 22 which is also carried by the head 21 gripping a portion of the rod 17 to further secure the head against movement with respect to the rod 17.

The head 21 is formed with a bearing 23 through which extends the vertical shaft 24 that has a right angled extremity 25 on which the steering or guide wheel 26 of the steering device is positioned. At the upper end of the shaft 24 is a cross arm 27 which is formed with a plurality of openings disposed in spaced relation with each other, adjacent to one end thereof, there being provided an opening 28 formed adjacent to the opposite end thereof, the openings nearest the ends of the arm 27 being designed to accommodate the outer ends of the coiled springs 29, the opposite ends of the coiled springs being connected to the supporting rod 17 as by means of the eye bolt 30. Thus it will be seen that the arm 27 is held in a horizontal position against the tensions of the springs 29, it being understood however that slight irregularities in the surface over which the machine is moving will cause slight movement of the guiding wheel 26.

Associated with the supporting rod 17 is an angular brace rod 18 which has adjustable connection with the head 32 that is bolted to the rod 17 as by means of the bolts 33. In order that the rods 17 and 18 will be maintained in proper spaced relation with each other, the spacing bar 34 is provided, which bar has connection with the rods 17 and 18 as through bolts 31. In order that the guiding wheel 26 may be manually operated, a controlling rod 35 is provided, which rod has connection with the rod 36 which extends through one of the openings in the cross arm 27. One end of the controlling rod 35 is disposed in the socket 37 formed in one end of the operating bar 38, which bar 38 may be moved to accomplish the moving of the wheel 26 as by means of the lever 39.

In the operation of the device, the rod 35 is set to a predetermined position, the wheel 26 being positioned in a furrow formed in the field. As the tractor is advanced, the wheel 26 follows the furrow and insures a true steering of the vehicle permitting the operator to direct his attentions to the running of the engine of the tractor.

Having thus described the invention, what is claimed as new is:—

1. In combination with one of the stub axles and steering wheels of a tractor, a guide wheel in advance of the steering wheels, spaced adjusting blocks in cooperative relation with said stub axle and rods connecting the guide wheel with said adjusting blocks, said rods capable of being adjusted to different positions with relation to each other.

2. In a steering gear for tractors, an axle, steering wheels, stub axles for the steering wheels pivotally connected to said axle, blocks secured to the outer and inner ends of one of said axles, said blocks having curved slots, a guide wheel in advance of the steering wheels and rods connecting the guide wheel with the blocks, each of said rods having a bolt adapted to move in the slot of the block associated therewith for adjusting the rods to different positions with relation to each other.

3. In a steering gear for tractors, an axle, steering wheels, stub axles for the steering wheels pivotally connected to said axle, adjusting blocks secured to one of said stub axles in spaced relation to each other, a guide wheel in advance of the steering wheels, a rod connecting said guide wheel with one of the adjusting blocks and a second rod connected to said first mentioned rod and to the other of said adjusting blocks, said rods capable of being adjusted to different angles with relation to each other.

4. In combination with the steering wheels of a tractor, an automatic steering device including a pair of adjusting blocks provided with curved slots having connection with one of the steering wheels on opposite sides thereof, a rod having one end thereof connected to one of the blocks having a bolt extending through the slot thereof to permit of adjustment of the rod with respect thereto, an angularly disposed rod having connection with the other of said blocks and having a bolt extending through the slot thereof to permit of adjustment of the rod with respect thereto, means for adjustably connecting the angularly disposed rod to the first mentioned rod, a guide wheel pivotally supported at the outer end of the first mentioned rod and means for adjusting the guide wheel to various angles.

5. In a steering device for tractors in combination with the steering wheels and their stub axles, adjusting blocks carried by the outer and inner ends of one of the stub axles, a guide wheel in advance of the steering wheels, rods connecting said guide wheel with one of the steering wheel stub axles through the medium of the adjusting blocks and means to permit lateral adjustment of the rods with relation to each other.

6. In a steering device for tractors, in combination with the steering wheels and their stub axles, adjusting blocks carried by the outer and inner ends of one of said stub axles, a guide wheel, rods connecting said guide wheel with the adjusting blocks and an adjustable block connection between the guide wheel and one of the rods to permit rotary adjustment of the guide wheel with relation to said rod.

7. In a steering device for tractors, in combination with the steering wheels and their stub axles, adjusting blocks carried by the outer and inner ends of one of the stub axles, a guide wheel, a rod connecting the steering with the outer adjusting block, a rod connecting said first mentioned rod with the inner adjusting block, means to permit lateral adjustment of said rods with relation to each other and a spacing bar connecting said rods at a point in advance of the adjusting blocks to maintain the rods in proper spaced relation with each other.

8. In combination with the stub axles and steering wheels of a tractor, an automatic steering device including adjusting blocks provided with curved slots carried by the outer and inner ends of one of the stub axles, a rod having one end thereof pivotally connected to one of the blocks, and having a bolt extending through the slot thereof to permit of the rod being set at different adjusted positions with respect thereto, an angularly disposed rod having connection with the other block and having a bolt extending through the slot thereof to permit of the rod being set at different adjusted positions with respect thereto, means for adjustably connecting the angularly disposed rod to the first mentioned rod, a steering wheel pivotally supported at the outer end of the first mentioned rod, and means for adjusting the steering wheel to various angles.

In testimony that I claim the foregoing as my own, I have hereto affixed my signature this 18 day of May, 1922.

ADOLPH A. RIETZKE.